United States Patent
Cox

[15] 3,680,788
[45] Aug. 1, 1972

[54] HOT GAS VALVE
[72] Inventor: Duane M. Cox, Logan, Utah
[73] Assignee: Thiokol Chemical Corporation, Bristol, Pa.
[22] Filed: June 20, 1966
[21] Appl. No.: 560,375

[52] U.S. Cl. ............... 239/265.23, 60/231, 137/340, 251/367, 251/368
[51] Int. Cl. ..................... B63h 25/46, B64c 15/16
[58] Field of Search ...... 239/265.23, 265.17; 60/230, 60/231; 137/334, 339, 340; 251/367, 368

[56] References Cited
UNITED STATES PATENTS 2,994,338   8/1961   Wilson ........................ 137/340
3,132,478   5/1964   Thielman ................. 239/265.23
3,145,529   8/1964   Maloof ....................... 102/92.5
3,147,590   9/1964   Thielman ....................... 60/231
3,150,486   9/1964   Hollstein et al. .............. 239/136
3,304,008   2/1967   Beam, Jr. .................. 239/265.17

Primary Examiner—Samuel Feinberg
Attorney—Thomas W. Brennan

[57] ABSTRACT

A valve for operation in a hot gas environment having a hydraulically operated movable member which is hollow and open at one end. Secured in the shell opening is a hollow cup-like insert which is formed of a porous material impregnated with a coolant material which when operated to open and close a hot gas passage thereby controlling flow of hot gas therethrough.

13 Claims, 6 Drawing Figures

PATENTED AUG 1 1972 3,680,788

INVENTOR.
Duane M. Cox
BY Thomas W. Brennan

INVENTOR.
Duane M. Cox
BY Thomas W. Brennan

HOT GAS VALVE

The present invention relates to a hot gas valve and more particularly to a hot gas valve adapted to operate in the hot gas environment of a rocket motor combustion chamber for the purpose of controlling the flow of hot gases bled through a laterally directed orifice in the exit cone of a rocket motor nozzle for thrust vector control of the propulsive gases passing therethrough.

It has been recognized that a rocket could be effectively steered by bleeding and diverting some of the propulsive gases of the rocket through a laterally directed orifice or port so that they impinge upon the main stream of the propulsive gases passing through the exit cone of a rocket nozzle substantially perpendicular to the longitudinal axis thereof. However, valve devices heretofore proposed for controlling the diverted gases did not prove successful for the reasons that the high temperature and erosive nature of the propulsive gases quickly destroyed the valves and rendered the thrust vector control system inoperative.

The present invention overcomes the problems and disadvantages of the proposed devices by providing a valve device having parts adapted for transpiration cooling and capable of operating in the hot gas environment of a rocket motor combustion chamber employing high-energy propellants having high flame temperatures exceeding 5,700° F.

It is, therefore, an object of the present invention to provide a hot gas valve device which will effectively control the flow of hot propulsive gases.

Another object is the provision of a valve device which can withstand the destructive effects of the hot gases of a rocket motor.

A further object is to provide a hot gas valve capable of operating within a rocket motor combustion chamber and effectively controlling the flow of hot gases therefrom through an orifice in the exit cone of a rocket nozzle.

Other objects and advantages of the present invention will become more fully apparent from consideration of the following detailed description relating to the accompanying drawings wherein.

Figure 1:
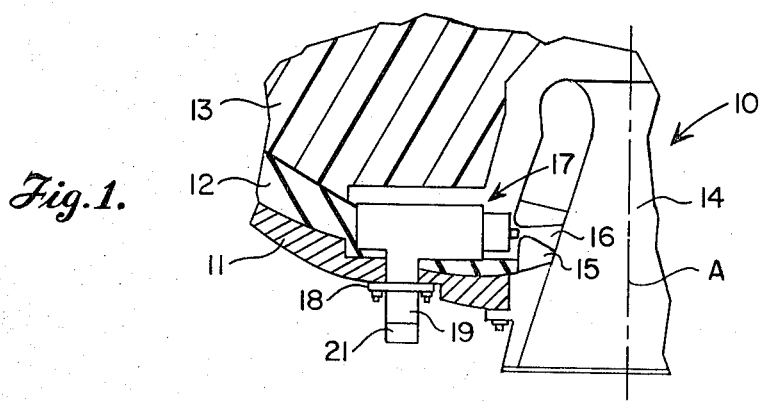
FIG. 1 is a fragmentary sectional view illustrating the relationship of the valve of this invention to a rocket motor and the nozzle thereof.

Referring now to the drawings, wherein like reference characters designate like or corresponding parts throughout the several views, there is shown in FIG. 1 a fragmentary sectional view of a rocket motor designated generally by reference numeral 10. Rocket motor 10 comprises a casing 11 suitably lined with insulation 12 and containing motor propellant 13, a nozzle 14 having an insert 15 through which a laterally directed injection orifice or port 16 extends and a valve device 17 for controlling the flow of hot gases from the casing through the orifice. Nozzle 14 is disposed with the major portion thereof within casing 11 to provide an internal or submerged nozzle, orifice 16 being positioned so that the secondary hot gas injection therethrough is directed into the exit cone substantially perpendicular to the longitudinal axis A of the nozzle. Valve device 17 is provided with a flange 18 for mounting the same in the casing 11 and has associated therewith the usual porting block 19 and servovalve 21 for hydraulic actuation of the valve device.

Figure 2:
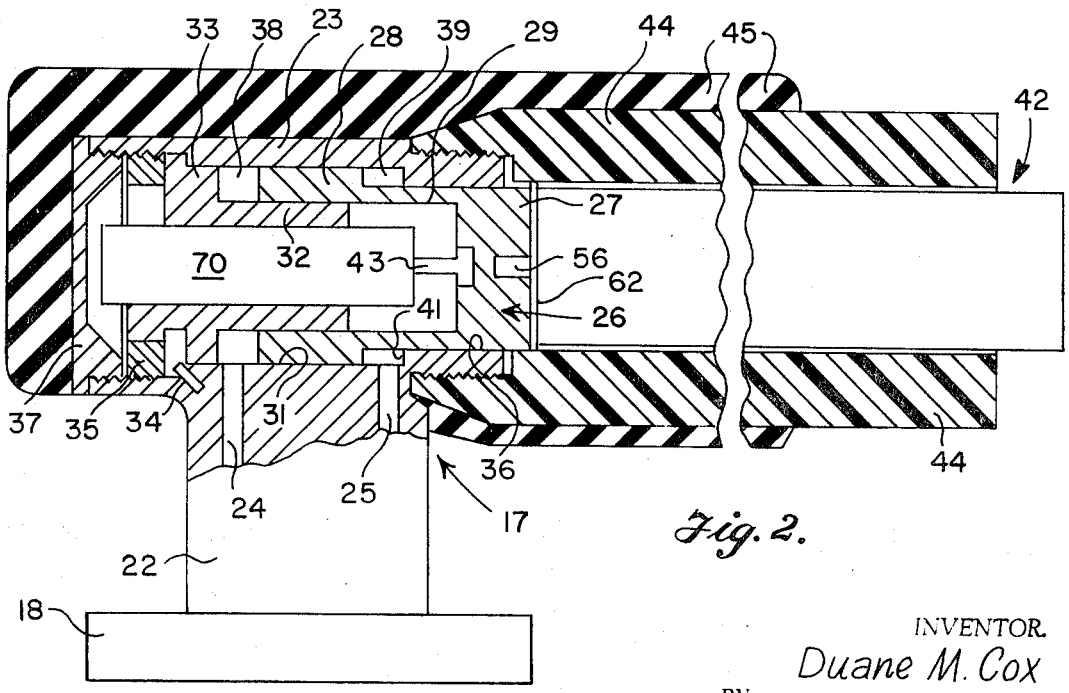
FIG. 2 is a sectional view, on a larger scale, of the valve device of FIG. 1.

Turning now to FIG. 2, there is shown a sectional view of the valve device 17 which comprises a support member 22 formed with the mounting flange 18 and a multi-bore actuator housing 23 and having a pair of hydraulic ducts 24, 25 therethrough. Mounted for reciprocal movement within housing 23 is a cup-like piston mechanism 26 comprising a head plate 27 and an annular portion 28 interconnected by thin side 29, all integrally formed. Annular portion 28 is fitted for sealed sliding movement within an intermediate bore portion 31 of housing 23 and is similarly fitted to a stationary gland or sleeve 32 disposed within portion 28, sleeve 32 having a flange 33 sealed to the intermediate bore portion 31 of housing 23 and held in place by a pin 34 and threaded retaining means 35. Plate 27 and thin side 29 are of smaller diameter than annular portion 28 and are fitted for sealed sliding engagement within the smallest diameter bore portion 36 of housing 23. The usual O-rings (not shown) are employed for sealing as necessary. Threaded closure cap 37 serves to close off the rear end of housing 23.

Duct 24 communicates with an annular chamber 38 defined by the space between the rear face of annular portion 28 and flange 33 and between intermediate bore portion 31 and sleeve 32. Duct 25 communicates with an annular chamber 39 defined by the space between the front face of portion 28 and the shoulder 41 formed by the difference in diameter between bore portions 31 and 36 and between thin side 29 and bore portion 31. As will be apparent, forcing hydraulic fluid into chamber 38 by way of duct 24 will expand the chamber and move the piston mechanism 26 to the right as viewed in FIG. 2, and to the left when chamber 39 is expanded by way of fluid admitted through duct 25.

Connected to the piston 26 for movement therewith is a pintle member, designated generally by reference numeral 42 and hereinafter described in greater detail, and a connector 43 operatively attached to the movable element (not shown) of a feedback means 70 fixedly supported within sleeve 32, which feedback means may be any desired form of transducer, for example, a linear potentiometer. Suitable leads (not shown) are brought through support member 22 for conveying the feedback signal to control instrumentation (not shown). Pintle 42 is surrounded along the major portion thereof by a protective housing 44 of suitable thermal insulation for example, molded carbon fiber phenolic overwrapped with carbon tape, and is slidable therewithin. Housing 44 is suitably secured at its inner or rear end to bore portion 36, as by threading or the like. A jacket 45 of suitable heat-resistant material, for example, thermal rubber insulation, provides protection to the actuator housing 23 and the parts therein.

Figure 3:
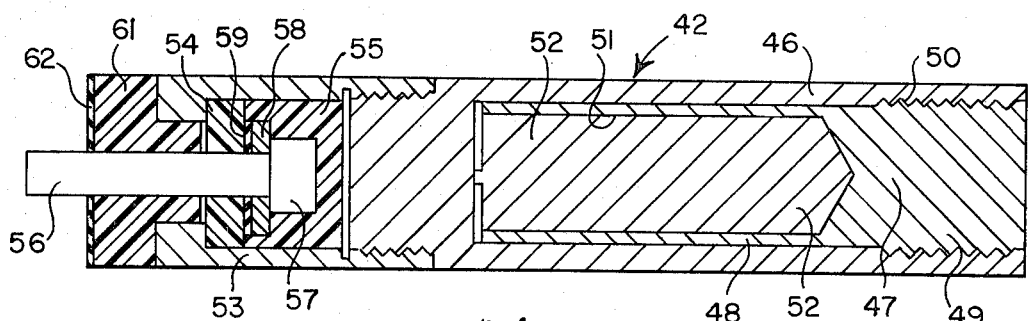
FIG. 3 is a detail sectional view, on a larger scale, of the pintle of the valve device of FIG. 2.

FIG. 3 shows a sectional detail view of the pintle member 42 which comprises a hollow shell or housing 46 in the form of a cup-like member of temperature resistant material, such as tungsten or thoriated tungsten, the latter being preferred because of its machinability and for the reason that the thorium oxide inhibits weldment of mating parts under high temperature and impact conditions. Received within shell 46 is an insert 47, also cup-like in form and made of a porous heat-resistant material, such as tungsten or the like. As will be noted, insert 47 has thin sides 48 and a relatively thick bottom 49 and a chamber or cavity 51 filled with a coolant substance 52, such as brass, copper, silver, sodium or the like, the substance 52 also filling the pores or interstices of the insert 47 for providing an impregnated valve part which, in a hot gas environment, is transpiration cooled by change of state of the substance from solid to liquid and the vaporization and carrying off the liquified substance from the interstices of the insert. Change of state of the substance in cavity 51, which constitutes a reservoir for maintaining the interstices filled, and the heat capacity and conductivity of the several parts also serve in keeping the valve device 17 sufficiently cool to withstand the destructive effects of the hot gas environment. Bottom 49 and shell 46 are threaded, as at 50, for securely retaining insert 47 in place.

Connected to the inner or rear end of shell 26, by threads or other suitable means, is a connecting link assembly comprising a metallic housing 53, which receives a washer 54 and a plug or cap 55 and holds the latter in place adjacent the rear end of the shell. A bolt 56, having a head 57 received in cap 55, extends rearwardly therefrom and passes through a metal washer 58, an expansion washer 59, washer 54, a bushing or sleeve 61, and an expansion washer 62, washers 59 and 62 being of rubber or the like. Bolt 56 is provided with threads or other suitable means for connection to and movement with plate 27 of piston 26. Parts 54, 55 and 61 are for the purpose of insulating bolt 56 and are made of a suitable plastic, for example, silica phenolic.

Figure 4:
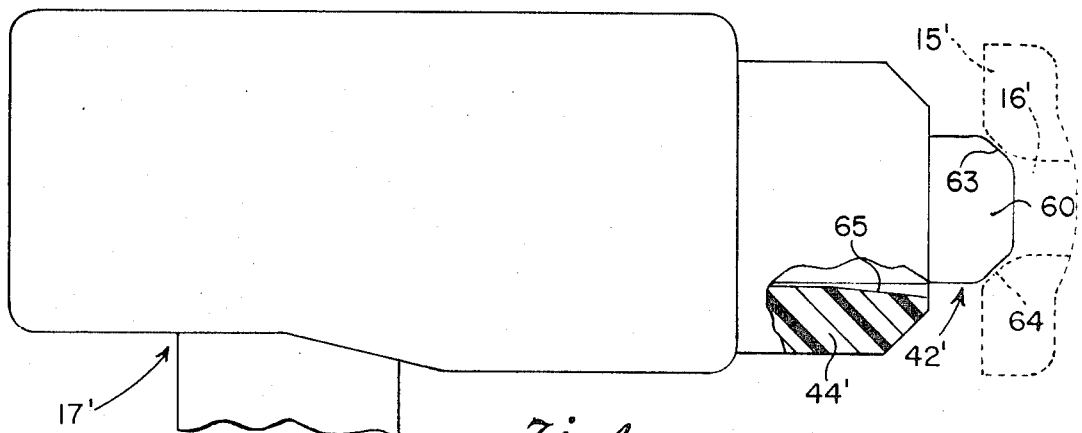
FIG. 4 is a fragmentary view somewhat similar to FIG. 2, but only partly in section, of a modified form of the valve device and showing the seating relation thereof.

FIGS. 1-3 illustrate features of a clearance type valve, so called because in the extended or closed position of the pintle 42 the end thereof projects into orifice 16 with a very small clearance annulus therebetween and a resulting gas leakage rate in the order of about 2 percent. FIG. 4 illustrates a seating type valve device 17' which is essentially similar to valve device 17 in design and operation, except for several features to be described. It will be noted that valve device 17' has a valve pintle 42' with a tapered end 60 which joins the cylindrical sides of the pintle on a radius or curved edge 63 that is adapted to seat on a frusto-conical surface 64 at the mouth of an orifice 16' in an insert 15' (shown fragmentarily in phantom), which is a modified form of the insert 15 in FIG. 2. The tapered end serves to guide the pintle into alignment and protective housing 44' may be cut away, as at 65, to accommodate any slight misalignment.

Figure 5:
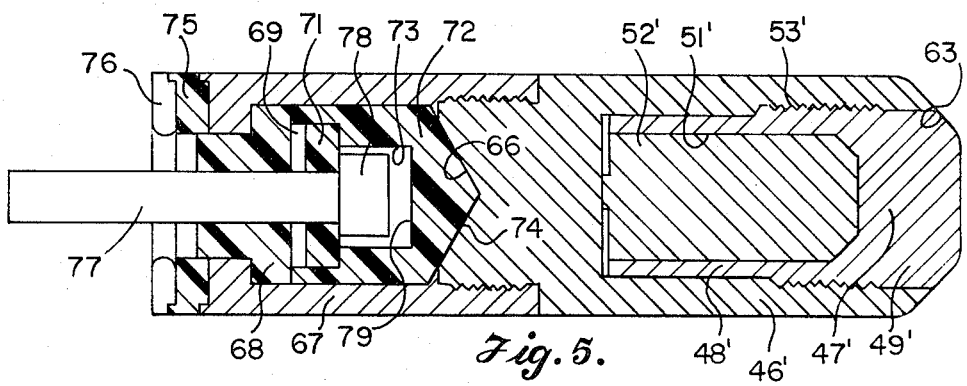
FIG. 5 is a sectional view of the pintle of the valve device of FIG. 4.

FIG. 5 is a sectional detail view of the pintle 42' employed in valve device 17'. Items 46' through 52' are similar in purpose and function to items 46 through 52, respectively, of pintle 42, except that parts 46' and 49' are cut away to provide the frusto-conical or tapered end 63 and the rear end of shell 46' is formed with a conical recess 66.

Because of the impact loads imposed upon pintle 42' in seating on surface 64, the connecting link assembly is modified to provide for cushioning of the pintle during such seating. To this end, housing or sleeve 67 is threaded to shell 46' and contains an insulating bushing or sleeve 68, an expansion washer 69, an insulating washer 71 and an insulating plug or cap 72 formed with a cavity 73 and a conical end 74 which fits into conical recess 66. Abutting the rear end of housing 67 is an insulating washer 75 of stepped form against the rear side of which is a metal washer 76. A bolt 77 has a head 78 disposed in the cavity 73 in plug 72 and extends through items 68, 69, 71, 75 and 76 with provision for movement relative thereto, a clearance normally existing between the bolt head and the end wall 79 of the cavity to accommodate such movement.

Figure 6:
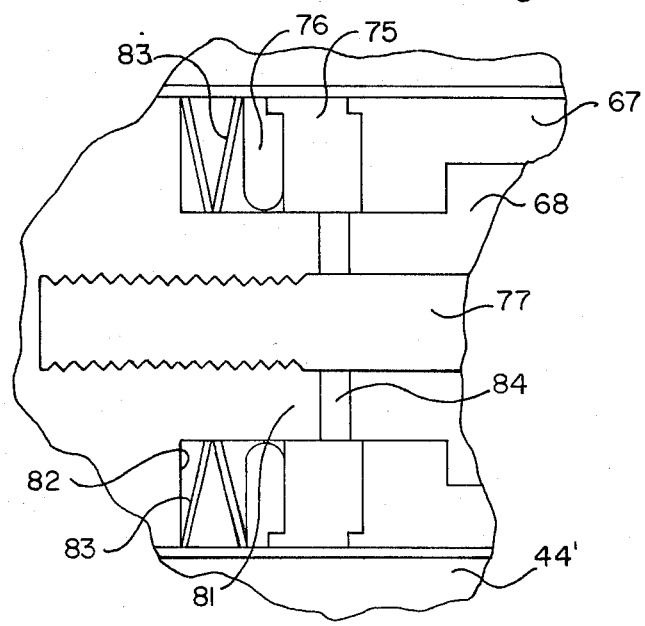
FIG. 6 is a fragmentary detail sectional view showing resilient connecting linkage.

Bolt 77 is adapted to be connected by threads or the like to the piston which, as will be seen in FIG. 6, is formed with an extension 81 and provides a shoulder 82, washers 75 and 76 being disposed about the extension. Also surrounding the extension 81 and reacting between shoulder 82 and the rear face of washer 76 is a cushion or resilient linkage in the form of a pair of thin discs or washers 83 of spring metal, for example, steel, which are dished so the sides thereof define inner and outer and frusto-conical surfaces. Washers 83 are referred to as belleville washers. Upon actuation of the piston to move the pintle to closed position (to the right in FIG. 6) force is transmitted through washers 83, the washers being preloaded and normally holding the bolt head 78 against washer 71. However, with increased loading of the pintle during seating, washers 83 deform and absorb energy, permitting movement of the bolt 77 relative to bushing 68 and associated parts, a clearance space 84 between extension 81 and the bushing accommodating relative movement therebetween. Washer 76 has the inner periphery thereof rounded to prevent binding and allow for any slight misalignment of the pintle and orifice.

While only one valve device has been shown and described as related to a rocket nozzle, it is to be understood that a plurality of such devices would be provided and located around the exit cone of the nozzle so as to effect steering in any desired direction.

The operation of the valve devices of this invention should be apparent from the foregoing description. However, briefly and in summary, ordinarily propulsive gases are developed in the rocket motor with the valve pintles in their extended or closed positions. When it is desired to effect steering of the rocket the appropriate valve device or devices are operated to retract the pintles thereof and allow hot gases to flow through the uncovered orifice or orifices and impinge upon the main stream of propulsive gases passing through the exit cone of the rocket nozzle for thrust vector control of the rocket. After the desired amount of thrust vectoring, the valve devices would be actuated to closed positions.

Of the embodiments of the valve devices shown and described herein, the seating type is preferred because the valve stroke versus valve flow area relationship is more linear, the stroke is shorter, it is less susceptible to erosion and deposition, and easier to design in that the pintle does not enter the orifice and it is not as important to determine exactly the radial growth of the pintle during operation with the attendant advantage that machining tolerances can be relaxed and higher reliability is inherent since there is no possibility of a gripping action between the pintle and the sides of the orifice.

Although FIG. 6 shows the resilient linkage as employing a pair of dished discs or washers, it will be appreciated that more than a pair, or even a single disc of sufficient strength and flexibility, could be used, and that each disc could be made up of a plurality of thin discs stacked together to provide the desired strength and stiffness.

Obviously many modifications and variations of the present invention are possible in light of the above teachings. It is, therefore, to be understood that within the scope of the appended claims the invention may be practiced otherwise than specifically described.

What is claimed is:

1. In a rocket thrust vector control system, the combination comprising a rocket nozzle having the major portion thereof disposed within a rocket motor casing, said nozzle having a laterally directed orifice extending through the side thereof communicating the interiors of said casing and nozzle, a hot gas valve device disposed within said casing and having a movable member for controlling the flow of hot gases through said orifice, said member containing a hollow cup-like part having a bottom portion adapted to be located relative to said orifice for controlling the flow of hot gases therethrough, at least the bottom portion of said part being formed of porous material having a high melting point and impregnated with a coolant material having a relatively lower melting point than the material of said part, and said coolant material filling the hollow of said part and constituting a reservoir for maintaining said porous material impregnated.

2. The combination of claim 1 wherein said porous material is tungsten and said coolant material includes a substance selected from the group comprising brass, copper, silver, sodium and the like.

3. The combination of claim 2 wherein said bottom portion is threadedly engaged in said member.

4. As an article of manufacture, a valve pintle comprising a hollow housing with cylindrical sides and an open forward end, a cup-like insert of porous material having thin sides and thick bottom, said insert secured in said housing in inverted fashion with said bottom closing said forward end of the housing and forming therewith a chamber, and coolant filler material adapted for transpiration cooling of said insert filling said chamber and the interstices of the porous material of said insert.

5. The article of claim 4 wherein said housing is formed of thoriated tungsten and said porous material is tungsten, and said coolant filler material is any substance selected from the group comprising brass, copper, silver, sodium and the like.

6. The article of claim 4 wherein said bottom and said housing are provided with threads for securing said insert in the housing.

7. The article of claim 4 wherein said housing and said bottom have tapered portions which together define a tapered end, and said tapered end is joined to said cylindrical sides on a radius.

8. A hot gas valve device comprising a longitudinally movable member, said member including a hollow shell open at one end and a cup-like insert secured in said shell and closing the open end thereof defining a reservoir therein, said insert being formed of porous tungsten material impregnated with a metallic coolant substance selected from the group consisting of brass, copper, silver, sodium and the like having a lower melting point than said material, said metallic substance filling said reservoir for maintaining said porous tungsten material impregnated, and actuator means for moving said member.

9. A hot gas valve device comprising a longitudinally movable member, said member including a hollow shell open at one end and a hollow cup-like insert secured in said shell and closing the open end thereof, said insert being formed of a porous material impregnated with a coolant substance having a lower melting point than said material and with thin sides and a relatively thick bottom portion, and actuator means for moving said member.

10. The device of claim 9 wherein said bottom portion of said insert is threaded to said shell.

11. A hot gas valve device comprising a longitudinally movable member, said member including a hollow shell open at one end and a hollow cup-like insert secured in said shell and closing the open end thereof, said insert being formed of a porous material and impregnated with a coolant substance having a lower melting point than said material, actuator means for moving said member, and insulated bolt means for connecting said actuator means to said member comprising a resilient linkage including dished washer means.

12. A hot gas valve device comprising a longitudinally movable member, said member including a hollow shell open at one end and a hollow cup-like insert secured in said shell and closing the open end thereof, said insert being formed of a porous material and impregnated with a coolant substance having a lower melting point than said material, actuator means for moving said member, and insulated bolt means for connecting said actuator means to said member comprising a bolt having a head received in an insulating cap located adjacent the closed end of said shell, and an insulating bushing surrounding the stem of said bolt.

13. The device of claim 12 wherein said bolt means further includes dished washer means and provision is made for movement of said bolt relative to said cap and bushing, said dished washer accommodating said relative movement.

* * * * *